United States Patent
Becker et al.

(10) Patent No.: US 7,110,850 B2
(45) Date of Patent: Sep. 19, 2006

(54) DEVICE FOR CONTROLLING DRIVES IN MACHINE TOOLS OR PRODUCTION MACHINES

(75) Inventors: Arnd Becker, Erlangen (DE); Thomas Heidl, Langenzenn (DE); Gerhard Heinemann, Erlangen (DE)

(73) Assignee: Siemens Aktiengesellschaft, Müchen (DE)

( * ) Notice: Subject to any disclaimer, the term of this patent is extended or adjusted under 35 U.S.C. 154(b) by 3 days.

(21) Appl. No.: 10/928,923

(22) Filed: Aug. 27, 2004

(65) Prior Publication Data
US 2005/0055120 A1    Mar. 10, 2005

(30) Foreign Application Priority Data
Aug. 28, 2003   (DE) ................. 103 39 731

(51) Int. Cl.
*G06F 19/00*   (2006.01)
*G06F 15/00*   (2006.01)

(52) U.S. Cl. ............. 700/174; 700/108; 700/159; 702/182; 702/187

(58) Field of Classification Search ........... 700/159, 700/169, 174, 175, 177, 108, 109, 110, 95; 702/182, 183, 184, 187, 188
See application file for complete search history.

(56) References Cited

U.S. PATENT DOCUMENTS

| | | | | |
|---|---|---|---|---|
| 5,469,553 A | * | 11/1995 | Patrick | 713/323 |
| 6,128,543 A | * | 10/2000 | Hitchner | 700/108 |
| 6,201,996 B1 | * | 3/2001 | Crater et al. | 700/96 |
| 6,778,945 B1 | * | 8/2004 | Chassin et al. | 700/276 |

* cited by examiner

*Primary Examiner*—Leo Picard
*Assistant Examiner*—Charles Kasenge
(74) *Attorney, Agent, or Firm*—Henry M. Feiereisen

(57) ABSTRACT

A device for controlling drives of machine tools or production machines is disclosed, whereby the device includes a permanent storage medium associated with the device and a trace module that records actual process values after the trace module is triggered. The actual process values are permanently stored on the permanent storage media in form of files in a standard file format. The device makes it possible to permanently store actual process values recorded by a trace functionality, in particular by a trace module, in the device for controlling drives in a standard data format.

20 Claims, 2 Drawing Sheets

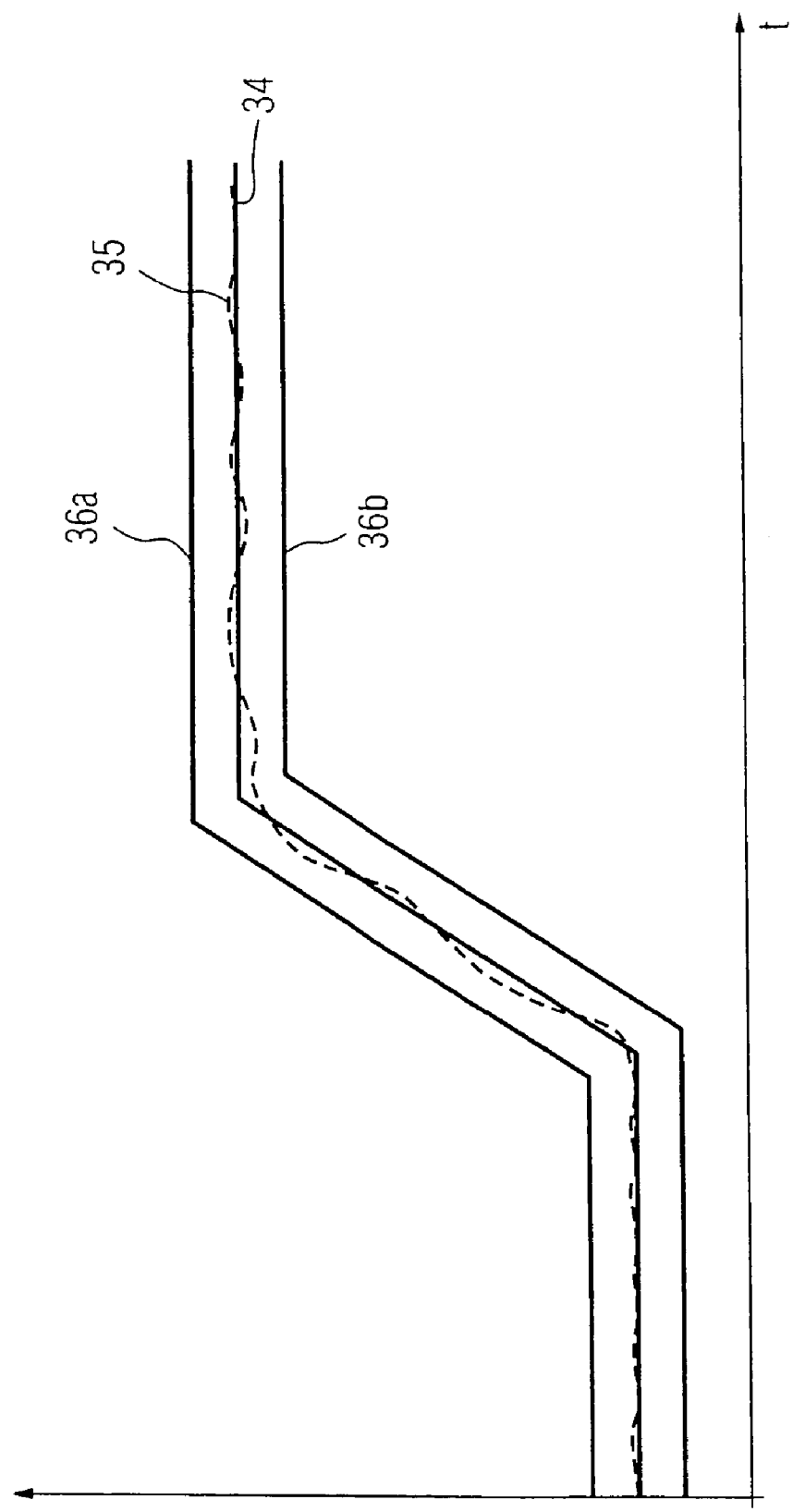

DEVICE FOR CONTROLLING DRIVES IN MACHINE TOOLS OR PRODUCTION MACHINES

CROSS-REFERENCES TO RELATED APPLICATIONS

This application claims the priority of German Patent Application, Serial No. 103 39 731.0, filed Aug. 28, 2003, pursuant to 35 U.S.C. 119(a)–(d), the disclosure of which is incorporated herein by reference.

BACKGROUND OF THE INVENTION

The present invention relates, in general, to a device for controlling drives in machine tools or production machines.

Nothing in the following discussion of the state of the art is to be construed as an admission of prior art.

In a modern machine tool or production machine, which can include, for example, a motor with a connected gear and load, a controller is typically associated with each drive. One controller can hereby simultaneously control several motors. The efficiency and the quality of almost all drives in machine tools and production machines depend directly on an optimized dynamic characteristic of the drive controller. A suitable test functionality for ensuring the desired control characteristic of the machine is therefore desirable.

A commercially available device for controlling drives in machine tools or production machines and for performing tests includes an internal trace module for recording signals, as well as an internal signal generator. The signal generator is used to add test signals to the control functions of the device as a measure of the excitation. The test signals can be, for example, a step excitation of a controller setpoint. In conventional, commercially available function generators, a user can only select a limited number of curve forms, for example, a step function, digital noise, a sine function and certain parameters (amplitude, offset, period duration, etc.). For performing the test, a trigger signal which can be generated by an external diagnostic/startup device, can trigger the trace module as well as the function generator. The function generator then adds the aforedescribed curve functions with predefined parameters to the control functions of the device, and records after triggering actual process values, which are also predefined through parameters, such as signals from external transducers or other signals within the control functions of the device. The user can then download to, for example, the diagnostic/startup device, the actual process values, that are non-permanently stored in the trace module, and evaluate the actual process values, wherein the signal curves are stored in the form of binary files that do not employ a standardized file format.

Another known test function is the so-called circularity test, which can only be performed in the presence of a supervisory controller. An application program in the supervisory controller generates a circular path in Cartesian coordinates. When the circularity test is selected, the supervisory controller configures, triggers and/or starts the trace module during the execution of the application program. However, the application program and the trace module are not precisely synchronized. Instead, the user has to initially start the application program, which includes following the path of a continuous circle, and subsequently activate the circularity test. The circularity test automatically compares the desired circle and the actual circle and determines the maximum deviations. These deviations are displayed on the user interface of the controller, but cannot be further processed directly by a supervisory automation plane or Internet services.

Because the aforedescribed circularity test is only a special test of a quality check of a machine tool or production machine and cannot be generally applied, it is customary to produce test workpieces in order to verify the accuracy and the dynamics of the machine. Because a test workpiece has typically a limited size, the machine characteristic is only checked in a correspondingly small portion of the machine workspace.

As mentioned above, the actual process values recorded by the trace module are not permanently stored and are also not stored in a standard file format, but have to be first transferred to an external startup/diagnostic device. The user can therefore not evaluate if, for example, the variation in the actual rotation speed during a change of the desired rotation speed stays within an acceptable limit, because for example process reference values recorded during the startup of the machine are no longer available for comparison. Another problem is that for a comprehensive evaluation, a startup/diagnostic device must always be connected to the device that controls the drive(s).

It is therefore desirable to permanently store actual process values that are recorded by a trace functionality, in particular by a trace module, in a standard file format in the device that controls the drives.

SUMMARY OF THE INVENTION

According to one aspect of the present invention, a device for controlling drives of machine tools or production machines includes a permanent storage medium associated with the device, and a trace module that records actual process values after the trace module is triggered. The actual process values are permanently stored on the permanent storage media as files in a standard file format.

According to an advantageous embodiment of the invention, the device can further include a device controller that controls the device, wherein a time when the trace module is triggered or parameters present in the device controller at the time when the trace module is triggered can be stored in the storage medium. In this way, the trigger time and the parameter configuration at the trigger time are also reliably stored for each file, so that the test conditions and test runs can be readily reproduced for any later point in time. In particular, such additional files are very important for a subsequent error diagnosis if the trace module is triggered after an error has been detected.

According to another advantageous embodiment, the file names of the stored files can be generated automatically or by a programmable algorithm. In this way, each file recorded in the permanent memory can have its own separate filename. The files stored during the different tests can then be more easily associated with a specific test.

According to yet another advantageous embodiment, the stored data can be protected from deletion or changes, so that the files cannot be unintentionally or willfully or changed. Such protection can be achieved, for example, by using a password.

According to the still another advantageous embodiment, the storage medium can be a flash card, because flash cards represent widely used standard memory media.

According to another embodiment of the invention, the device can include a diagnostic/startup device that can be connected externally to the device, wherein the diagnostic/ startup device can trigger the trace module. A diagnostic/startup device is typically provided for testing purposes of a machine.

According to yet another advantageous embodiment of the invention, the device can include a supervisory controller with a motion program that can trigger the trace module. By triggering the trace module with the motion program of a supervisory controller, actual process variables can be recorded at any location of the motion program or a motion process, and permanently recorded.

According to yet another advantageous embodiment, several of the devices can be connected with each other or with the supervisory controller, with each of the devices including a trace module, wherein the trace modules of the devices are triggered synchronously. In this way, a single trigger signal can simultaneously trigger the trace molecules of the different devices that control the drives.

According to yet another advantageous embodiment of the invention, the device includes a function generator that can be triggered, wherein the function generator supplies to the device controller test signals stored on the storage medium in the form of files in a standard file format stored. The device controller adds the test signals to the actual process values. In this way, arbitrary test signals for testing the control functions of the device can be predefined for the function generator.

According to yet another advantageous embodiment, the function generator can be triggered synchronously with the trace module, because the function generator and the trace module can then operate in a time-synchronized fashion.

Advantageously, a diagnostic/startup device that triggers the function generator can be connected externally to the device. A diagnostic/startup device is typically available for machine testing.

According to yet another advantageous embodiment, the device can include a supervisory controller, whereby an application program executed on the supervisory controller triggers the function generator. The function generator can then be triggered at any location of the application program and/or at any location of the motion process of the machine for adding test signals to the control function of the device.

According to another advantageous embodiment of the invention, several devices can be connected with each other or with the supervisory controller, so that the function generators of the devices can be triggered synchronously, with all function generators being activated simultaneously by a single trigger signal.

According to another advantageous embodiment of the invention, the device can further include an evaluation unit, wherein the storage medium stores process reference values in form of files in a standard format, and wherein the evaluation unit compares the process reference values with the actual process values of the device and evaluates the process reference values using evaluation functions.

By being able to compare actual process values with process reference values and evaluate them with evaluation functions, an excellent testing functionality can be achieved with a reliable identification of errors.

According to another advantageous embodiment, the stored files with the process reference values can be generated externally and downloaded to the permanent storage medium. In this way, process reference variables can be generated on an external computer.

According to another advantageous embodiment, the evaluation unit can provide a user with a quality parameter representing a result of the evaluation. A quality parameter makes evaluation of test results both easy and clear.

Advantageously, the device can further include a supervisory automation plane or an Internet service, which can be provided with the actual process values, process reference values, test signals, parameters that are present in a device controller and/or results of an evaluation of the actual process values and process reference values. This can, for example, enable a manufacturer to perform the evaluation on the supervisory automation plane and/or the Internet service.

According to yet another advantageous embodiment, the storage medium can also store parameter sets for configuring the trace module or the function generator. In this way, the user can define for the controller of the device different predefined excitation signals by selecting different parameter sets and record different actual process values.

Advantageously, the standard file format can be a file format based on FAT 16 format, FAT 32 format, NTFS format or ASCII format, because such standard file formats are widely used that can be read and processed by many commercially available programs.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 shows a diagram for evaluating actual process variables based on process reference values.

DETAILED DESCRIPTION OF PREFERRED EMBODIMENTS

Figure 1:
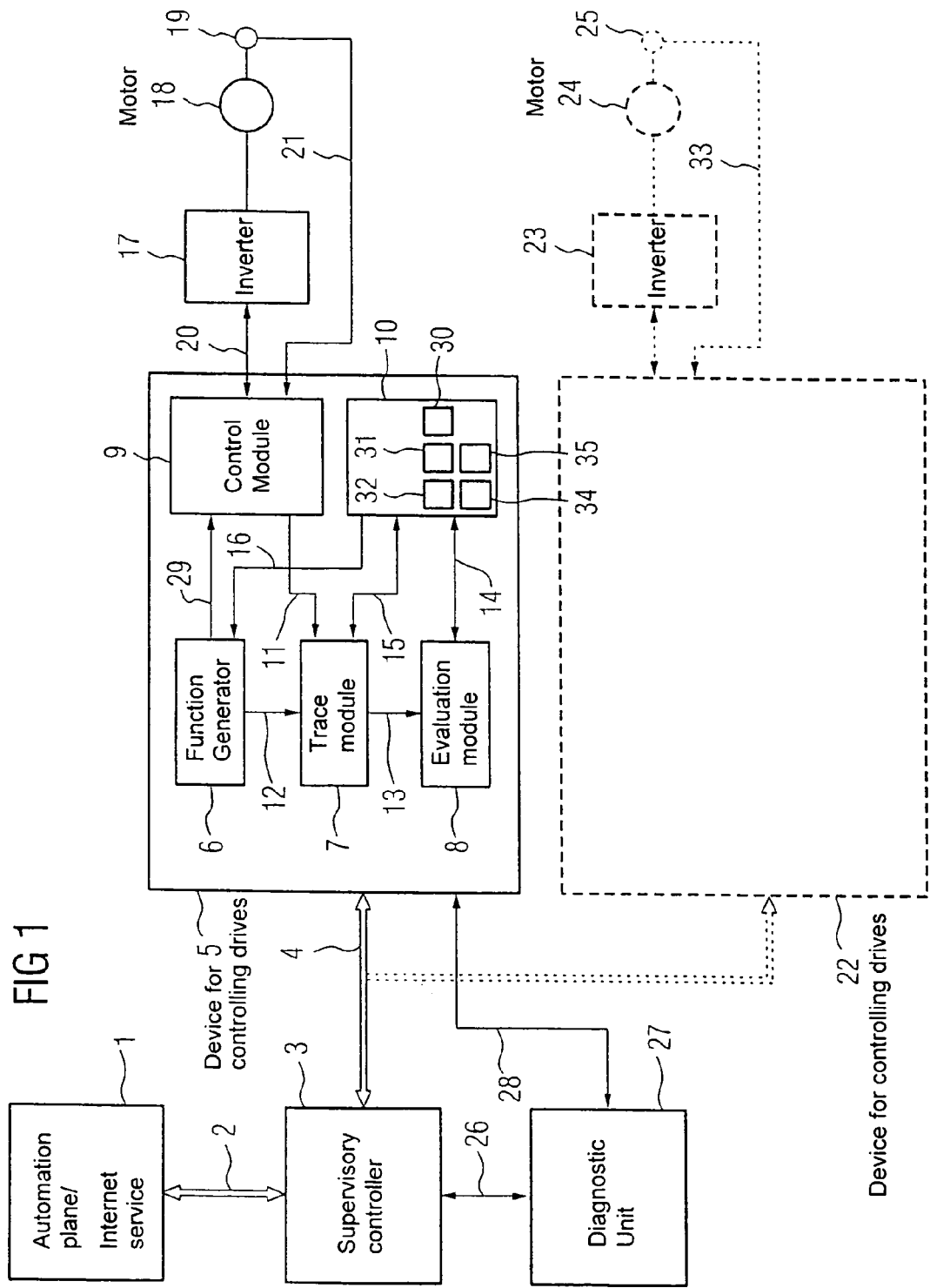
FIG. 1 shows an exemplary device according to the invention for controlling drives with connected components.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in the form of a schematic block diagram an exemplary device 5 according to the invention for controlling drives, as well as optionally connected peripheral devices. The illustrated embodiment of the device 5 according to the invention includes a function generator 6, a trace module 7, an evaluation module 8, a control module 9, as well as a nonvolatile storage medium 10, which in the illustrated embodiment is implemented as a flash card. The function generator 6, the trace module 7, the evaluation module 8, and the control module 9 can be implemented with a microprocessor-controlled system as software modules or software components, but can alternatively or in addition also be implemented in hardware.

Files 30 with actual process values, files 31 with test signals, files 32 with process reference values, parameterization files 34 and files 35 with quality parameters are stored on the nonvolatile memory medium 10. The control module 9 controls via a connection 20 an inverter 17 which in turn powers and/or controls a motor 18. The motor 18 includes a transducer which provides the actual rotation speed of the motor to the control module 9 via the link 21. The actual rotation speed can be viewed as an actual process variable.

In the illustrated embodiment, the device 5 according to the invention is connected via a bus link 4 with a supervisory controller 3. Optionally, the device 5 of the invention can include other components in addition to the depicted components 6, 7, 8, 9 and 10, which are not shown for the sake of clarity. The supervisory controller 3 is connected via the bus link 4 with the components 6, 7, 8, 9 and 10 for exchange of the data, which has been omitted from FIG. 1 for sake of clarity. In normal operation, the supervisory controller provides to the control module 9 setpoints for controlling the motor 18 via the bus link 4. The supervisory controller 3 executes an application program that provides the setpoints for the control module 9. The supervisory controller 3 is connected for data exchange with a supervisory automation plane 1 via a link 2. Alternatively or in addition, the supervisory controller 3 can also be connected for data exchange via an Internet connection with Internet services associated, for example, with the manufacturer of the machine. In this case, the link 2 could be implemented as an Internet connection and the block having the reference numeral 1 could represent, for example, an Internet service.

Moreover, a diagnostic/startup device 27 is connected with the device 5 of the invention via a link 28. Although not explicitly shown in FIG. 1 for sake of clarity, the diagnostic/startup device 27 can access via the link 28 all components of the device 5, such as the function generator 6, the trace module 7, the output module 8, the control module 9, as well as the storage medium 10, and can exchange data with them. Alternatively, the diagnostic/startup device 27 can also be connected via a link 26 with the supervisory controller 3 so as to be able to access all components of the device 5 via the bus link 4.

For testing the control functions of the control module 9, the function generator 6 can add via the link 29 to the control function of the control module 9 arbitrary test signals at user-definable locations, so as to be able to test the control functionality of the device 5. The curve form and the time dependence of the test signals can be freely defined by the user and stored in the files 31 on the storage medium 10. The function generator 6 generates the test signals by accessing the files 31 in which the test signals are defined. This takes place via the link 16. Alternatively, other predefined test signals, such as a step function, a triangular pulse shape, or a sine function, which can be parameterized by specifying amplitude, frequency and offset can also be used.

The trace module 7 is used to record actual process variables. The actual process variables represent signals of the control functions generated inside the control module 9, signals of external transducers as well as test signals generated by function generator 7. The actual process variables are provided to the trace module 7 via the links 12 and 11 for recording. After the variables have been recorded, the trace module 7 stores via link 15 one or more files 30 with the actual process variables. The user can define via one or more parameterization files 34 the test signals to be generated by the function generator 6 and/for the actual process variables to be recorded by the trace module 7. This information is also provided to the function generator 6 via the link 16 and to the trace module 7 via the link 15.

For defining the start time when the test signals are generated in the function generator 6 and the start time when the actual process variables are recorded in the trace module 7, the function generator 6 and the trace module 7 have an independent trigger input, which is not shown in FIG. 1 for sake of clarity. The function generator 6 and the trace module 7 can also be triggered by the diagnostic/startup device 27 via the link 28 and/or 26, or by the supervisory controller 3 via the bus link 4. In order to be able to later compare different actual process variables with each other, the function generator 6 and the trace module 7 must be triggered synchronously. For enabling the supervisory controller 3 to normally and flexibly trigger the trace module 7 and the function generator 6, the bus link 4 is implemented as a real-time-capable data bus. The interface between the supervisory controller 3 and the device 5 is implemented for the user as an open real-time-capable cyclical data interface.

Alternatively, the trigger signals can also be generated within the device 5, for example by comparison with a trigger threshold.

The function generator 6 and the trace module 7 can be precisely synchronized by an application program executed in the supervisory controller 3 at a user-definable location by synchronously addressing the interface. Since an application program can be used to predefine practically any number of complex motion processes, a significant number of files 30 with actual process values and/or large datasets can be stored on a large-capacity storage medium 10. This allows comprehensive tests on the machine. For example, only the trace module 7 can be triggered while the function generator 6 remains inactive. Moreover, a so-called virtual workpiece can also be tested without actual machining a physical workpiece in the machine by checking based on the recorded transducer signals if the setpoints were satisfied within a certain tolerance band.

If errors are detected, the trace module 7 can also be triggered by the device 5 of the invention itself or by the supervisory controller 3 for analyzing the data errors.

For tests used to test dynamic processes, the important actual process values can be initially recorded with the trace module 7 and stored in storage medium 10 in the form of files 30 with actual process variables. These actual process values can then be downloaded and visualized using a connected diagnostic/startup device 27, or alternatively the supervisory controller 3. A user, in particular a trained user, can then analyze and evaluate the signal curves of the actual process values, and decide, if the signal curves have the desired characteristic. The actual process values can then be accessed on the storage medium 10 in the form of files 32 as process reference values for, for example, subsequent automatic tests.

The files 30 with actual process values, the files 31 with test signals, the files 32 with process reference values, the parameterization files 34, and the files with quality parameters 35 are stored on the nonvolatile memory medium 10 in a standard file format, which can be based, for example, on the FAT 16 format, NTFS format or ASCII format. Advantageously, the amount of the stored data is then limited only by the available memory locations in the storage medium 10. Moreover, the files can be accessed by the supervisory controller 3 and/or by the diagnostic/startup device 27 by using a simple standardized access protocol.

While the trace module 7 is used to display the characteristic actual process values of a process, the function generator 6 can be used to supply test signals, such as excitation signals for the control module 9, for example to simulate faults, loads or machining processes. User-definable points, where the signals can be supplied, are provided within the control module 9. Examples for such signals are, for example, a desired rotation value, a desired rotation torque or a voltage setpoint. The possible curve forms can be generalized by supplying to the function generator 6 signals that are stored in the storage medium 10 in the form of files 31 with the test signals.

When a machine is started up, process reference values can be stored in the storage medium 10 as files 32. Subsequently recorded actual process values, which are stored in the storage medium 10 as files 30, can be compared with the process reference values. This process can be certified by also storing on the storage medium for each file or within each file the date and time of the measurement, or the trigger time. Also stored can be the instantaneous parameterization state of the controller of the device, for example, in form of a verifiable stamp. This additional date can then be used to determine later if parameters changed between different measurements. In addition, a relationship with the version of the parameterization can be established, which can be stored, for example, in the diagnostic/startup device. Suitable password mechanisms can be used to protect the files against both unauthorized and unintentional changes.

The evaluation module 8 can be used to compare the actual process values with the process reference values. Different evaluation functions of the evaluation module 8 can provide several comparison operations that can be selected by selecting suitable parameters. For example, a least-square method or a maximum absolute deviation methods can be used, which are evaluated over a predetermined sliding time window across the recorded signals. The evaluation module 8 can provide as a result of such evaluation, for example, a quality parameter which provides a user with a quantitative measure of the quality of the control functionality and/or of the manufacturing process or the manufacturing precision. The evaluation module 8 then stores the quality parameter via the link 14 together with date and time on the storage medium 10. By downloading the file(s) 35 with quality parameters to the startup/diagnostic device 27 or to the supervisory controller 3, the user can now derive historical quality data for an analysis of the evolution of the quality over time.

Moreover, such tests can be initialized by the device 5 of the invention cyclically or automatically in user-programmable time intervals, allowing continuous updating of the file(s) 35 that contain the quality parameters. Alternatively or I addition, the device 5 of the invention and/or the evaluation module 8 can trigger an alarm when the quality falls below a certain quality and, for example, stop the manufacturing or production process.

It should be noted that the file names of the files stored in the storage medium 10 are generated by an automatic or programmable algorithm integrated in device 5.

In principle, the evaluation can take place, as described above, in the device 5, in the diagnostic/startup device 27, in the supervisory controller or in the supervisory automation plane 1, or if implemented, via Internet services, for example of the manufacturer, connected to the supervisory controller 3. Evaluation in the device 5 of the invention itself has the advantage that autonomous devices 5 that do not include a supervisory controller 3 or do not have an intelligent control panel, can also use the evaluation functionality. It should be noted that the device 5 of the invention is fully functional, in particular with simple machines, even without a supervisory controller 3. The setpoints, for example for controlling the device, are then normally stored in the control module 9 or on the storage medium 10.

It should also be noted that the quality parameter can be indexed, which makes it possible to follow, for example, the development of the control quality over several test cycles. When operating with a supervisory controller 3, the computed evaluation function can be outputted at the end of the application program. The corresponding quality value is then automatically determined and stored in a parameter so as to be available in the supervisory automation plane 1 or, if Internet services are connected, for additional, optionally automatic processing. This can facilitate remote diagnosis/remote maintenance.

The function generator 6 and the trace module 7 are preferably configured via parameters. These parameters define the actual process values and/or test signals to be used by the function generator 6 or the trace module 7. The parameters are frequently changed, for example during startup, when an operator seeks to use the trace module 7 and the function generator 6 to optimize the drive characteristic. A suitable configuration of these parameters for subsequent diagnostic runs can be obtained by switching between different predefined parameterizations that are stored in one or more parameter files 34. The various parameters sets can be indexed; alternatively, a parameter file 34 can be established for each parameter set. The corresponding process reference values and quality criteria are activated in the evaluation module 8 when a certain parameter set is selected and loaded.

Not only can previously determined actual process values be used as process reference values for the comparison, as mentioned above, but externally generated process reference values can also be used. An example for externally generated process reference values is shown in FIG. 2.

FIG. 2 shows a diagram of a test signal 34 which represents a jump in a setpoint of the control module 9, as a function of time. The actual process signal 35 recorded by the trace module 7 follows the test signal 34. Two process reference values 36a and 36b define an upper and/or lower tolerance threshold for the actual process signal 35. If the tolerance thresholds are exceeded or underrun, an alarm is triggered and the production process or machining operation is stopped.

It should be mentioned that the inverter 17 can also be an integral component of the device 5 according to the invention that controls the drives.

It should also be mentioned that a machine tool or production machine can also have a several devices 5 according to the invention which are connected with each other by a bus link 4, or which if a supervisory controller 3 is present, can also be connected with the supervisory controller 3. FIG. 1 indicates with dotted lines an additional device 22 according to the invention, which is identical to the device 5 of the invention, with connected peripheral devices. The components indicated by the dotted lines also include an inverter 23, a motor 24, a transducer 25, and an actual process signal 33 as well as a bus link indicated by a dotted line. The internal components of the device 22 of the invention have been omitted from the drawings for sake of clarity; they are identical to the components included in the device 5 according to the invention. Starting with a central trigger signal, which can be initiated, for example, by the supervisory controller 3 or the diagnostic/startup device 27 or also by the device 5 of the invention, all devices according to the invention that are connected via the bus link 4 can be triggered synchronously, i.e., at the same time. In the example depicted in FIG. 1, which shows a single additional device 22, the function generator and the trace module of the device 22 would then be triggered simultaneously by the function generator 6 and the trace module 7 of the device 5, so that high level tests on more than one device 5, 22 can be performed.

With the invention, the currently used simple tests can be expanded to include comprehensive system-wide tests of the dynamic drive characteristic of a machine. Load and function tests after completion of the machine can be expanded and simplified by supplying the nonvolatile memory medium with function generator curves and process reference values. The dynamic test runs can then be started and evaluated without additional means by a simple parameterization. In addition, the machine manufacturer can perform meaningful machine tests without additional means, for example for acceptance tests after manufacture and/or at the customer site. The tests can be repeated and compared at any time, for example after software updates or replacement of mechanical parts of the machine. In repeated tests, which can be compared with each other and, for example, with a reference test, early changes in the machine characteristic can be identified and a possible malfunction can be detected. Since the tests functionality can also be invoked by the application program, automatic production monitoring can also be performed. Certified machine characteristics can always be checked through comparison with process reference values. Even if the device of the invention is not connected with a supervisory controller or a diagnostic/startup device 27, or if the device 5 does not include a supervisory controller 3, the user can still perform simple diagnostic tests which only require the evaluation of a single parameter in the form of a quality criterion. The measurement results can always be associated with the parameter values stored on the diagnostic/startup device by using the stored time and the parameterization information. In this way, an improvement or a deterioration in the control quality as a result of parameter changes can be visualized and documented. Because all diagnostic functions can also be operated by a supervisory controller, an association with a supervisory automation plane, with Internet services or with other remote diagnostic and maintenance services is possible.

Machine tools in the context of the present invention can also include, for example, uniaxial or multi-axis lathes, milling machines, as well as drilling or grinding machines. Machine tools can further include processing centers, linear and rotary transfer machines, laser machines, rolling machines and/or gear cutters. These machines have in common that the material is machined along several axes. Production machines in the context of the present invention can include textile, paper, plastic, wood, glass, ceramic or stone processing machines, as well as machines used for forming, packaging, printing, conveying, lifting, pumping, transporting. Furthermore, fans, blowers, wind turbines, lifting gear, cranes, robots, production and assembly lines are also included under the term production machines in the context of the present invention.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A device for controlling drives of machine tools or production machines, comprising:
    a device controller that controls the device;
    a permanent storage medium associated with the device and storing externally generated process reference values in form of files in a standard format;
    a trace module that records actual process values after the trace module is triggered by an event in the device, wherein the actual process values are permanently stored on the permanent storage medium in form of files having a standard file format; and
    an evaluation unit comparing the process reference values with the actual process values of the device and evaluating the actual process values using evaluation functions,
    wherein a time when the trace module is triggered or parameters present in the device controller at the time when the trace module is triggered are stored in the storage medium.

2. The device of claim 1, wherein file names of the stored files are generated automatically or by a programmable algorithm.

3. The device of claim 1, wherein the stored data are protected from deletion or changes.

4. The device of claim 1, wherein the storage medium is a flash card.

5. The device of claim 1, further comprising a diagnostic/startup device that is connected externally to the device, said diagnostic/Startup device triggering the trace module.

6. The device of claim 1, further comprising a function generator capable of being triggered, wherein the function generator supplies to the device controller test signals stored on the storage medium in the form of files in a standard file format stored, said device controller adding the test signals to the actual process values.

7. The device of claim 6, wherein the function generator is triggered synchronously with the trace module.

8. The device of claim 6, further comprising a diagnostic/startup device connected externally to the device, said diagnostic/startup device triggering the function generator.

9. The device of claim 6, further comprising a supervisory controller, wherein an application program executed on the supervisory controller triggers the function generator.

10. The device of claim 1, wherein the evaluation unit provides a user with a quality parameter representing a result of the evaluation.

11. The device of claim 1, further comprising a supervisory automation plane or an Internet service, wherein a quantity selected from the group consisting of the actual process values, process reference values, test signals, parameters present in a device controller and/or results of an evaluation of the actual process values and the process reference values is provided to the supervisory automation plane or Internet service.

12. The device of claim 1, further comprising a function generator capable of being triggered by the event in the device, wherein the storage medium stores parameter sets for configuring the trace module or the function generator.

13. The device of claim 1, wherein the standard file format is a file format based on FAT 16 format, FAT 32 format, NTFS format or ASCII format.

14. A system for controlling drives of machine tools or production machines, comprising:
    a supervisory controller including a motion program;
    a plurality of devices connected with each other or with the supervisory controller, each of the devices including a trace module, wherein the trace modules are triggered synchronously by an event in one or more devices and record actual recess values after being triggered;

a permanent storage medium associated with the devices and storing externally generated process reference values in form of files in a standard format; and an evaluation unit comparing the process reference values with the actual process values of the devices and evaluating the actual process values using evaluation functions, wherein the actual process values are permanently stored on the permanent storage medium in form of files having a standard file format.

15. The system of claim 14, wherein file names of the stored flies are generated automatically or by a programmable algorithm.

16. The system of claim 14, wherein the stored process values are protected from deletion or changes.

17. The system of claim 14, wherein the storage medium is a flash card.

18. The system of claim 14, wherein each of the devices comprises a device controller that controls the devices and a function generator capable of being triggered by the event in the one or more devices, wherein the function generator supplies to the device controller test signals stored on the storage medium In the form or files in a standard file format, said device controller adding the test signals to the actual process values.

19. The system of claim 18, wherein an application program executed on the supervisory controller triggers the function generators.

20. The system of claim 18, wherein the function generators are triggered synchronously.

* * * * *